United States Patent
Sandstrom et al.

(12)

(10) Patent No.: US 6,239,203 B1
(45) Date of Patent: *May 29, 2001

(54) METHOD OF IMPROVING THE ABRASION RESISTANCE OF A RUBBER COMPOSITION

(75) Inventors: Paul Harry Sandstrom, Tallmadge; Harold Allen Marsh, Akron, both of OH (US)

(73) Assignee: The Goodyear Tire & Rubber Company, Akron, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,715

(22) Filed: Sep. 4, 1997

(51) Int. Cl.[7] .......................................................... C08J 5/09

(52) U.S. Cl. ................................................................ 524/385
(58) Field of Search ............................................... 524/385

(56) References Cited

U.S. PATENT DOCUMENTS

| 3,840,382 | 10/1974 | Burke ...................................... 106/288 |
| 4,824,897 | 4/1989 | Kaido et al. ........................... 524/385 |
| 5,039,726 | 8/1991 | Wideman et al. ..................... 524/271 |
| 5,059,347 | 10/1991 | Mollet et al. ..................... 252/400.62 |
| 5,116,534 | 5/1992 | Mollet et al. ......................... 252/308 |
| 5,252,650 | 10/1993 | Wideman et al. ..................... 524/318 |

*Primary Examiner*—Peter D. Mulcahy
(74) *Attorney, Agent, or Firm*—Bruce J Hendricks

(57) ABSTRACT

There is disclosed a method for improving the abrasion resistance of a cured rubber composition that is particularly suited for a tire tread compound comprising (a) dispersing from 1.0 phr to 30 phr of a $C_{12}$–$C_{36}$ alcohol and from 0.5 to 2.0 phr of sulfur throughout a dry isolated sulfur-vulcanizable rubber and (b) curing the rubber.

17 Claims, No Drawings

METHOD OF IMPROVING THE ABRASION RESISTANCE OF A RUBBER COMPOSITION

BACKGROUND OF THE INVENTION

The abrasion resistance of a rubber compound may be an extremely important property depending on its application. This is especially the case where the application is in a tire tread. The greater the abrasion resistance, the greater the treadlife of the tire.

A common method to improve the abrasion resistance is to use increasing levels of low particle-size carbon blacks. Unfortunately, with increasing levels of carbon black, there is a concomitant reduction in rebound properties. Since the rolling resistance of a tire is correlated to rebound properties, one does not want to sacrifice one beneficial property (rolling resistance) for another (treadwear). Therefore, there exists a need for increasing the abrasion resistance of a rubber compound without a significant reduction in rebound properties.

SUMMARY OF THE INVENTION

The present invention relates to a method for improving the abrasion resistance of a cured rubber composition that is particularly suited for a tire tread compound comprising (a) dispersing from 1.0 phr to 30 phr of a $C_{12}$–$C_{36}$ alcohol and from 0.5 to 2.0 phr of sulfur throughout a dry isolated sulfur-vulcanizable rubber and (b) curing the rubber.

DETAILED DESCRIPTION OF THE INVENTION

There is disclosed a method of improving the abrasion resistance of a cured rubber composition that is particularly suited for a tire tread compound comprising (a) adding from 1.0 to 30 phr of a $C_{12}$–$C_{36}$ alcohol and from 0.5 to 2.0 phr of a sulfur vulcanizing agent to 100 parts by weight of at least one dry isolated sulfur-vulcanizable rubber selected from the group consisting of natural rubber, conjugated diene homopolymers and copolymers and from copolymers of at least one conjugated diene and aromatic vinyl compound;

(b) dispersing the $C_{12}$–$C_{36}$ alcohol and sulfur throughout the rubber; and (c) curing the rubber.

The present invention may be used to improve the physical properties of dry, isolated sulfur-vulcanizable synthetic rubbers or elastomers containing olefinic unsaturation. The terms "dry and isolated" are intended to only include those elastomers which have been recovered from a natural latex and an emulsion or solution after polymerization, isolated and dried. Therefore, dry and isolated specifically excludes rubbers in cement or latex. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. The term "treated rubber" means a dry and isolated synthetic rubber which has had a $C_{12}$–$C_{36}$ alcohol added to it and thereafter the $C_{12}$–$C_{36}$ alcohol is dispersed throughout the rubber. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers.

Specific examples of rubbers for use in the tread rubber composition are natural rubber, synthetic cis 1,4-polyisoprene, 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl), high vinyl polybutadiene rubber (50–90 percent vinyl) and mixtures thereof.

In one aspect, the treated rubber is combined with untreated diene-based rubbers. In another aspect, two or more treated rubbers may be combined. For example, a combination of two or more treated rubbers that is preferred includes treated cis 1,4-polyisoprene rubber, treated 3,4-polyisoprene rubber, treated styrene/isoprene/butadiene rubber, treated emulsion and solution polymerization derived styrene/butadiene rubbers, treated cis 1,4-polybutadiene rubbers and treated emulsion polymerization prepared butadiene/acrylonitrile copolymers.

In one aspect of this invention, a treated emulsion polymerization derived styrene/butadiene (E-SBR) might be used having a relatively conventional styrene content of about 20 to about 28 percent bound styrene or, for some applications, an E-SBR having a medium to relatively high bound styrene content; namely, a bound styrene content of about 30 to about 45 percent.

The relatively high styrene content of about 30 to about 45 for the treated E-SBR can be considered beneficial for a purpose of enhancing traction, or skid resistance, of the tire tread. The presence of the treated E-SBR itself is considered beneficial for a purpose of enhancing processability of the uncured elastomer composition mixture, especially in comparison to a utilization of a treated solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent.

The treated solution polymerization prepared SBR (S-SBR) typically has a bound styrene content in a range of about 5 to about 50, preferably about 9 to about 36, percent. The treated S-SBR can be conveniently prepared, for example, by organo lithium catalyzation in the presence of an organic hydrocarbon solvent.

A purpose of using treated S-SBR is for improved tire rolling resistance as a result of lower hysteresis when it is used in a tire tread composition.

The treated 3,4-polyisoprene rubber (3,4-PI) is considered beneficial for a purpose of enhancing the tire's traction when it is used in a tire tread composition. The untreated 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The treated cis 1,4-polybutadiene rubber (BR) is considered to be beneficial for a purpose of enhancing the tire tread's wear, or treadwear. The untreated BR can be prepared, for example, by organic solution polymerization of 1, 3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer."

The alcohols for use in the present invention are primary, straight chain, saturated monoalcohols having from 12 to 36 carbon atoms. Representative examples of such alcohols include 1-dodecanol (lauryl alcohol), 1-tetradecanol (myristyl alcohol), 1-hexadecanol (cetyl alcohol), 1-octadecanol (stearyl alcohol), 1-eicosanol (arachidyl alcohol), 1-docosanol (behenyl alcohol), 1-tetracosanol, 1-hexacosanol, 1-octaconsanol, 1-triacontanol (melissyl alcohol), 1-dotriacontanol, 1-tetratriacontanol and mixtures thereof. The preferred alcohol is 1-octadecanol.

The present invention relates to the use of the above alcohols to improve the abrasion resistance of a tire tread rubber. The $C_{12}$–$C_{36}$ alcohol that is used in the present invention may be added to the isolated dry rubber by any conventional technique such as on a mill, extruder or in a Banbury. The amount of $C_{12}$–$C_{36}$ alcohol may vary widely depending on the type of rubber and other compounds present in the vulcanizable composition. Generally, the amount of $C_{12}$–$C_{36}$ alcohol is used in a range of from about 1.0 to about 30.0 phr with a range of 2 to about 15 phr being preferred. The $C_{12}$–$C_{36}$ alcohol may be added during the nonproductive stage or productive stage of mixing but is preferably added in the nonproductive stage.

A commercially available octadecanol is commercially available from Procter & Gamble Chemicals under the designation CO-1895 Stearyl Alcohol. This product has a melting point of 58° C. and a G.C. Chain length distribution (percent by weight) of $C_{14}$ 0.1 percent, $C_{16}$ 1.3 percent, $C_{18}$ 95.5 percent and $C_{20}$ 0.9 percent.

For ease in handling, the $C_{12}$–$C_{36}$ alcohol may be used per se or may be deposited on suitable carriers. Examples of carriers which may be used in the present invention include silica, carbon black, alumina, kieselguhr, silica gel and calcium silicate.

The process of the present invention involves curing the rubber composition containing the $C_{12}$–$C_{36}$ alcohol. In order to cure such rubber composition, a sulfur vulcanizing agent is dispersed throughout the composition. Since the rubber composition is particularly suited for a tire tread, caution must be exercised in the level of sulfur vulcanizing agent that is used. For example, high levels of sulfur common in wirecoat compounds should be avoided as such amounts have detrimental effects on tire tread compounds. The sulfur vulcanizing agent should be used in an amount ranging from 0.5 phr to 2.0 phr, with a range of from 1.0 to 1.5 phr being preferred. Representative examples of sulfur vulcanizing agents include elemental sulfur ($S_8$), an amine disulfide, polymeric polysulfide and sulfur olefin adducts. Preferably, the sulfur vulcanizing agent is elemental sulfur.

In a preferred embodiment, the rubber composition contains a sufficient amount of carbon black and silica, if used, to contribute a reasonably high modulus and high resistance to tear. The total filler may be added in amounts ranging from 30 to 200 phr. The carbon black is generally present in an amount ranging from 15 to 120 phr. If silica is also present, the amount of silica, if used, may vary. Generally speaking, the amount of silica will vary from 0 to 80 phr. Preferably, the amount of silica will range from 5 to 40 phr.

Where the rubber composition contains both silica and carbon black, the weight ratio of silica to carbon black may vary. For example, the weight ratio may be as low as 1:5 to a silica to carbon black weight ratio of 30:1. Preferably, the weight ratio of silica to carbon black ranges from 1:3 to 5:1. The combined weight of the silica and carbon black, as herein referenced, may be as low as about 30 phr, but is preferably from about 45 to about 90 phr.

The commonly employed carbon blacks used in tread rubber compounding application can be used as the carbon black in this invention. Representative examples of such carbon blacks include N110, N121, N220, N231, N234, N242, N293, N299, S315, N330, M332, N339, N343, N347, N351, N358 and N375. These carbon blacks have iodine absorptions ranging from 68 to 145 g/kg and DBP No. ranging from 72 to 130 cm³/100 g.

The commonly employed particulate precipitated silica used in rubber compounding applications can be used as the silica in this invention. These precipitated silicas include, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

Whereas the $C_{12}$–$C_{36}$ alcohol improves the properties of a silica-filled rubber composition, the processing of the sulfur-vulcanizable rubber may be conducted in the presence of a sulfur containing organosilicon compound. Examples of suitable sulfur containing organosilicon compounds are of the formula:

in which Z is selected from the group consisting of

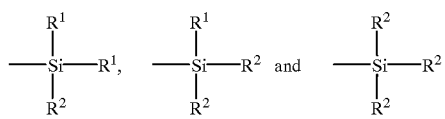

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilyl ethyl) pentasulfide, 3,3'-bis(tricyclohexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2- methylpropyl) disulfide.

The preferred sulfur containing organosilicon compounds are the 3,3'-bis(trimethoxy or triethoxy silylpropyl) sulfides. The most preferred compound is 3,3'-bis (triethoxysilylpropyl) tetrasulfide which is commercially available from Degussa under the commercial designation X50S. Therefore, as to formula I, preferably Z is

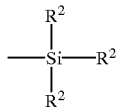

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of formula I in a rubber composition will vary depending on the level of silica that is used. Generally speaking, the amount of the compound of formula I, if used, will range from 0.01 to 1.0 parts by weight per part by weight of the silica. Preferably, the amount will range from 0.05 to 0.4 parts by weight per part by weight of the silica.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, the additives mentioned above are selected and commonly used in conventional amounts for tire tread applications. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) of the preceding non-productive mix stage (s). The rubber, silica (if used) and carbon black are mixed in one or more non-productive mix stages. The $C_{12}$–$C_{36}$ alcohol may be added during a nonproductive or productive mix stage. The terms "non-productive" and "productive" mix stages are well known to those having skill in the rubber mixing art.

Any treated sulfur-vulcanizable rubber composition containing silica should, as well as the sulfur-containing organosilicon compound, if used, be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention is used for a tire tread compound. Such tires can be built, shaped, molded and cured by various methods which are known and will be readily apparent to those having skill in such art. As can be appreciated, the tire tread may be on a passenger tire, aircraft tire, truck tire and the like. Preferably, the tire is a passenger tire. The tire may also be a radial or bias, with a radial tire being preferred.

The invention may be better understood by reference to the following examples in which the parts and percentages are-by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

Green strength of each sample was determined using an Instron machine which was equipped with a "C" load cell that was operated at a crosshead speed of 20 inches per minute (50.8 cm/minute). Samples were prepared from milled uncured stock which was 0.05 inches (0.127 cm) thick that was enclosed in Holland paper. Test specimens which were 6 inches (15.24 cm) long and 0.5 inch (1.27 cm) wide were died out of the samples. The Holland paper was carefully removed from the test specimens prior to testing in order to avoid pre-stressing. The average thickness of the test specimens was determined with a dial micrometer gauge to the nearest 0.001 inch (0.00254 cm). The test specimens were then tested using a 1-inch (2.54 cm) jaw space. Tensile strength and elongation were determined based upon the original cross sectional area of the uncured test specimen.

Strebler adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing.

The invention may be better understood by reference to the following examples in which the parts and percentages are by weight unless otherwise indicated.

EXAMPLE I

In this example, synthetic cis 1,4-polyisoprene treated with octadecanol was evaluated in comparison with untreated cis 1,4-polyisoprene.

Rubber compositions containing the materials set out in Table 1 were prepared in a BR Banbury™ mixer using two separate stages of addition (mixing); namely, one non-productive mix stage and one productive mix stage. The non-productive stage was mixed for up to 4 minutes or to a rubber temperature of 160° C. whichever occurred first. The mixing time for the productive stage was to a rubber temperature of 120° C. for 2 minutes.

The rubber compositions are identified herein as Samples 1 and 2. Sample 1 is considered herein as a control without the use of octadecanol added during the non-productive mixing stage.

The samples were cured at about 150° C. for about 36 minutes.

Table 2 illustrates the behavior and physical properties of the cured samples 1 and 2.

It is clearly evident from the results that the use of octadecanol results in higher abrasion resistance without a significant loss in rebound values.

TABLE 1

|  | Control Ex. 1 | Ex. 2 |
| --- | --- | --- |
| Non-Productive |  |  |
| Polyisoprene[1] | 100 | 100 |
| Carbon Black | 50 | 50 |
| Processing Oil[2] | 5 | 5 |
| Zinc Oxide | 5 | 5 |
| Fatty Acid[3] | 2 | 2 |
| Octadecanol[4] | 0 | 3 |
| Productive |  |  |
| Non-Productive | 162 | 165 |
| Sulfur | 1.4 | 1.4 |
| Sulfenamide Accelerator | 1 | 1 |

[1]Synthetic cis 1,4-polyisoprene which is commercially available from The Goodyear Tire & Rubber Company under the designation Natsyn ® 2200
[2]Naphthenic/Paraffinic processing oil
[3]Primarily stearic, also contains palmitic and oleic acids
[4]CO-1895 Stearyl alcohol from Procter & Gamble Chemicals, 95 percent, melting point 58° C.

TABLE 2

| Samples | 1 | 2 |
| --- | --- | --- |
| Octadecanol | 0 | 3 |
| Rheometer 150° C. |  |  |
| Max Torque | 39.3 | 35.0 |
| Min Torque | 8.5 | 8.4 |
| Delta Torque | 30.8 | 26.6 |
| T25 (min) | 10.3 | 9.5 |
| T90 (min) | 14.3 | 13.3 |
| Reversion | 1.3 | .8 |
| Stress Strain 36' @ 150° C. |  |  |
| 100% M (MPa) | 2.08 | 2.00 |
| 300% M (MPa) | 10.9 | 10.2 |
| Tensile Strength (MPa) | 23.5 | 24.0 |
| Elongation @ Break (%) | 562 | 592 |

TABLE 2-continued

| Samples | 1 | 2 |
|---|---|---|
| Hardness | | |
| RT | 61.4 | 61.2 |
| 100C | 56.7 | 54.8 |
| Rebound | | |
| RT | 46.0 | 44.1 |
| 100C | 62.6 | 62.9 |
| DIN Abrasion (lower is better) | 122 | 82 |
| Green Strength | | |
| 40% Strain | .24 | .31 |
| 80% Strain | .32 | .39 |
| 120% Strain | .26 | .39 |
| 240% Strain | .17 | .33 |
| 480% Strain | .09 | .30 |
| Max % Strain | .06 | .28 |
| Strebler Adhesion, @ 93° C. (Newtons) | 139 | 156 |

It is clearly evident from the results that the addition of 3 phr octadecanol to a carbon black-loaded rubber vulcanizate (Sample 2) provides unexpected improvements in DIN abrasion resistance. Other critical compound properties are only marginally affected by this addition of octadecanol. Such results suggest application of this approach to a tire tread which would exhibit improved treadwear.

EXAMPLE 2

In this example, synthetic cis-1,4-polyisoprene was evaluated in a rubber compound containing carbon black and silica where the processing oil was replaced with octadecanol. The mixing procedure was similar to Example 1 with the exception of a "heat treatment" step in Non-productive 2 where the compositions were mixed for 5 minutes at a controlled temperature of 160° C. to assure the proper coupling reaction between silica and the coupling agent. The presence of the octadecanol provides a significant improvement in DIN abrasion resistance which is a critical property for tire tread compounds. Other listed properties are similar for the control Sample 3 and the experimental Sample 4. The lower rebound at RT combined with the higher rebound at 100° C. shown for the experimental Sample 4 might suggest an opportunity to improve both rolling resistance (higher at 100° C.) and wet traction (lower at RT, 23° C.).

TABLE 3

| | Control Ex. 3 | Ex. 4 |
|---|---|---|
| Non-Productive 1 | | |
| Polyisoprene[1] | 100 | 100 |
| Carbon Black | 15 | 15 |
| Silica[2] | 20 | 20 |
| Coupling Agent[3] | 3 | 3 |
| Antioxidant[4] | 2 | 2 |
| Processing Oil[5] | 5 | 0 |
| Zinc Oxide | 5 | 5 |
| Fatty Acid[6] | 2 | 2 |
| Octadecanol | 0 | 5 |
| Non-Productive 2 | | |
| Silica | 15 | 15 |
| Coupling Agent[3] | 2 | 2 |
| Productive | | |
| Sulfenamide Accelerator | 2 | 2 |
| Diphenylguanidine | 0.5 | 0.5 |
| Sulfur | 1.5 | 1.5 |

[1]Natsyn ® 2200
[2]HiSil 210 from PPG
[3]X50S from Degussa GmbH (50 percent active)
[4]Polymerized 1,2-hydro-2,2,4-trimethyl quinoline type
[5]Naphthenic/Paraffinic Processing Oil
[6]Primarily stearic acid, also contains palmitic and oleic acid

TABLE 4

| Samples | 3 | 4 |
|---|---|---|
| Octadecanol | 0 | 5 |
| Processing Oil | 5 | 0 |
| Rheometer 150° C. | | |
| Max Torque | 44 | 43.8 |
| Min Torque | 4.8 | 3.5 |
| Delta Torque | 39.2 | 40.3 |
| T25 | 11.75 | 11.0 |
| T90 | 15.75 | 15.75 |
| Reversion (60 mins) | 0.3 | 0 |
| Stress Strain 36' @ 150° C. | | |
| 100% M (MPa) | 2.7 | 2.8 |
| 300% M (MPa) | 12.1 | 12.2 |
| Tensile Strength (MPa) | 20.4 | 20.7 |
| Elongation at Break, (%) | 483 | 492 |
| Hardness RT | 66.0 | 68.7 |
| 100° C. | 63.4 | 61.8 |
| Rebound RT | 54.1 | 48.5 |
| 100° C. | 68.8 | 72.2 |
| DIN Abrasion | 106 | 88 |
| Strebler Adh @ 93° C. (Newtons) | 80 | 69 |

While certain representative embodiments and details have been shown for the purpose of illustrating the invention, it will be apparent to those skilled in this art that various changes and modifications may be made therein without departing from the spirit or scope of the invention.

What is claimed is:

1. A method of improving the abrasion resistance of a cured rubber tire tread compound comprising
   (a) adding from 3 to 30 phr of a $C_{12}$–$C_{36}$ alcohol and from 0.5 to 2.0 phr of a sulfur vulcanizing agent to 100 parts by weight of at least one dry isolated sulfur-vulcanizable rubber selected from the group consisting of natural rubber, conjugated diene homopolymers and copolymers and from copolymers of at least one conjugated diene and aromatic vinyl compound;
   (b) dispersing the $C_{12}$–$C_{36}$ alcohol and sulfur vulcanizing agent throughout the elastomer; and
   (c) curing the rubber.

2. The method of claim 1 wherein said $C_{12}$–$C_{36}$ alcohol is a primary, straight chain, saturated monoalcohol.

3. The method of claim 1 wherein said $C_{12}$–$C_{36}$ alcohol is selected from the group consisting of 1-dodecanol, 1-tetradecanol, 1-hexadecanol, 1-octadecanol, 1-eicosanol, 1-docosanol, 1-tetracosanol, 1-hexacosanol, 1-octaconsanol, 1-triacontanol, 1-dotriacontanol, 1-tetratriacontanol and mixtures thereof.

4. The method of claim 1 wherein said $C_{12}$–$C_{36}$ alcohol is 1-octadecanol.

5. The method of claim 1 wherein said $C_{12}$–$C_{36}$ alcohol is added in an amount ranging from 3 to 15 phr.

6. The method of claim 1 wherein said sulfur vulcanizing agent is added in amounts of from 1.0 to 1.5 phr.

7. The method of claim 1 wherein said sulfur vulcanizing agent is selected from the group consisting of elemental sulfur, an amine disulfide, polymeric polysulfide and sulfur olefin adducts.

8. The method of claim 7 wherein said sulfur vulcanizing agent is elemental sulfur.

9. The method of claim 1 wherein from 30 to 200 phr of total filler is mixed with said rubber.

10. The method of claim 1 wherein from 5 to 40 phr of a particulate precipitated silica is mixed with said rubber.

11. The method of claim 10 wherein a sulfur containing organosilicon compound is present with said silica and is of the formula:

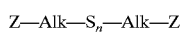

in which Z is selected from the group consisting of

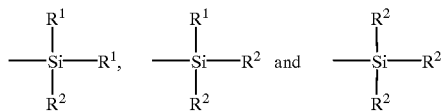

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

12. The method of claim 11 wherein said sulfur containing organosilicon compound is present in an amount ranging from 0.01 to 1.0 parts by weight per part by weight of the silica.

13. The method of claim 1 wherein a carbon black filler is added to said rubber composition in an amount ranging from 15 to 120 phr.

14. The method of claim 13 wherein said carbon black has an iodine absorption ranging from 68 to 145 g/kg and a DBP No. ranging from 72 to 130 $cm^3$/100 g.

15. The method of claim 13 wherein said carbon black is selected from the group consisting of N110, N121, N220, N231, N234, N242, N293, N299, S315, N330, M332, N339, N343, N347, N351, N358 and N375.

16. The method of claim 1 wherein said rubber is selected from the group consisting of natural rubber, synthetic cis 1,4-polyisoprene, 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubbers, trans 1,4-polybutadiene rubber (70–95 percent trans), low vinyl polybutadiene rubber (10–30 percent vinyl), medium vinyl polybutadiene rubber (30–50 percent vinyl), high vinyl polybutadiene rubber (50–90 percent vinyl) and mixtures thereof.

17. The method of claim 1 wherein said rubber composition is thermomechanically mixed at a rubber temperature in a range of from 140° C. to 190° C. for a mixing time of from 1 to 20 minutes.

* * * * *